(12) United States Patent
Barry et al.

(10) Patent No.: US 7,522,088 B2
(45) Date of Patent: Apr. 21, 2009

(54) SYSTEM AND METHOD FOR MONITORING AIRSPACE

(75) Inventors: James Barry, Madison, CT (US);
Timothy Cinello, Tampa, FL (US);
Matthew Marcella, West Hempstead, NY (US); Ron Dunsky, Brooklyn, NY (US)

(73) Assignee: PASSUR Aerospace, Inc., Bohemia, NY (US)

( * ) Notice: Subject to any disclaimer, the term of this patent is extended or adjusted under 35 U.S.C. 154(b) by 1 day.

(21) Appl. No.: 11/590,418

(22) Filed: Oct. 31, 2006

(65) Prior Publication Data

US 2007/0139252 A1    Jun. 21, 2007

Related U.S. Application Data

(60) Provisional application No. 60/731,712, filed on Oct. 31, 2005.

(51) Int. Cl.
*G01S 13/00* (2006.01)
*G08G 1/16* (2006.01)

(52) U.S. Cl. .................. 342/29; 701/301

(58) Field of Classification Search .................. 342/29; 701/301

See application file for complete search history.

(56) References Cited

U.S. PATENT DOCUMENTS

| | | | | |
|---|---|---|---|---|
| 4,706,198 | A * | 11/1987 | Thurman | 701/120 |
| 5,528,730 | A * | 6/1996 | Yagi et al. | 706/52 |
| 2003/0004641 | A1 * | 1/2003 | Corwin et al. | 701/301 |
| 2003/0122701 | A1 * | 7/2003 | Tran | 342/29 |
| 2005/0200501 | A1 * | 9/2005 | Smith | 340/963 |

* cited by examiner

*Primary Examiner*—Thomas H Tarcza
*Assistant Examiner*—Harry Liu
(74) *Attorney, Agent, or Firm*—Fay Kaplun & Marcin, LLP

(57) ABSTRACT

A method for receiving data corresponding to an aircraft in a monitored airspace, comparing the data to rules, each rule corresponding to a threat posed by the aircraft and generating a threat indication based on at least one of the rules triggered by the data. A system having a rule set including a plurality of rules corresponding to potential threats in a monitored airspace and an airspace monitor receiving data corresponding to aircraft in the monitored airspace and comparing the data to the plurality of rules, the airspace monitor generating a threat indication when the data triggers at least one of the rules.

18 Claims, 3 Drawing Sheets

SYSTEM AND METHOD FOR MONITORING AIRSPACE

PRIORITY CLAIM/INCORPORATION BY REFERENCE

This application claims the benefit of U.S. Provisional Patent Application 60/731,712 filed on Oct. 31, 2005 and entitled "Rapid Response" and is expressly incorporated herein, in its entirety, by reference.

BACKGROUND

Since September 11 it has become important to monitor airspace to evaluate threats from civilian aircraft. Governmental entities such as the Department of Homeland Security are interested in monitoring both secured and unsecured airspace. In addition, other governmental agencies (e.g., a city Emergency Management department, etc.) and private entities (e.g., private owners of refineries, chemical plants, etc.) may also be interested in monitoring airspace in their vicinity. The early identification of threats can lead to the implementation of effective countermeasures when a threat is real and imminent. However, it is also important to distinguish real threats from false threats so that inappropriate or excessive action is not taken.

SUMMARY OF THE INVENTION

A method for receiving data corresponding to an aircraft in a monitored airspace, comparing the data to rules, each rule corresponding to a threat posed by the aircraft and generating a threat indication based on at least one of the rules triggered by the data.

A system having a rule set including a plurality of rules corresponding to potential threats in a monitored airspace and an airspace monitor receiving data corresponding to aircraft in the monitored airspace and comparing the data to the plurality of rules, the airspace monitor generating a threat indication when the data triggers at least one of the rules.

A system comprising a memory storing a set of instructions and a processor executing the instructions. The instructions being operable to receive data corresponding to an aircraft in a monitored airspace, compare the data to rules, each rule corresponding to a threat posed by the aircraft and generate a threat indication based on at least one of the rules triggered by the data.

DETAILED DESCRIPTION

Figure 1:
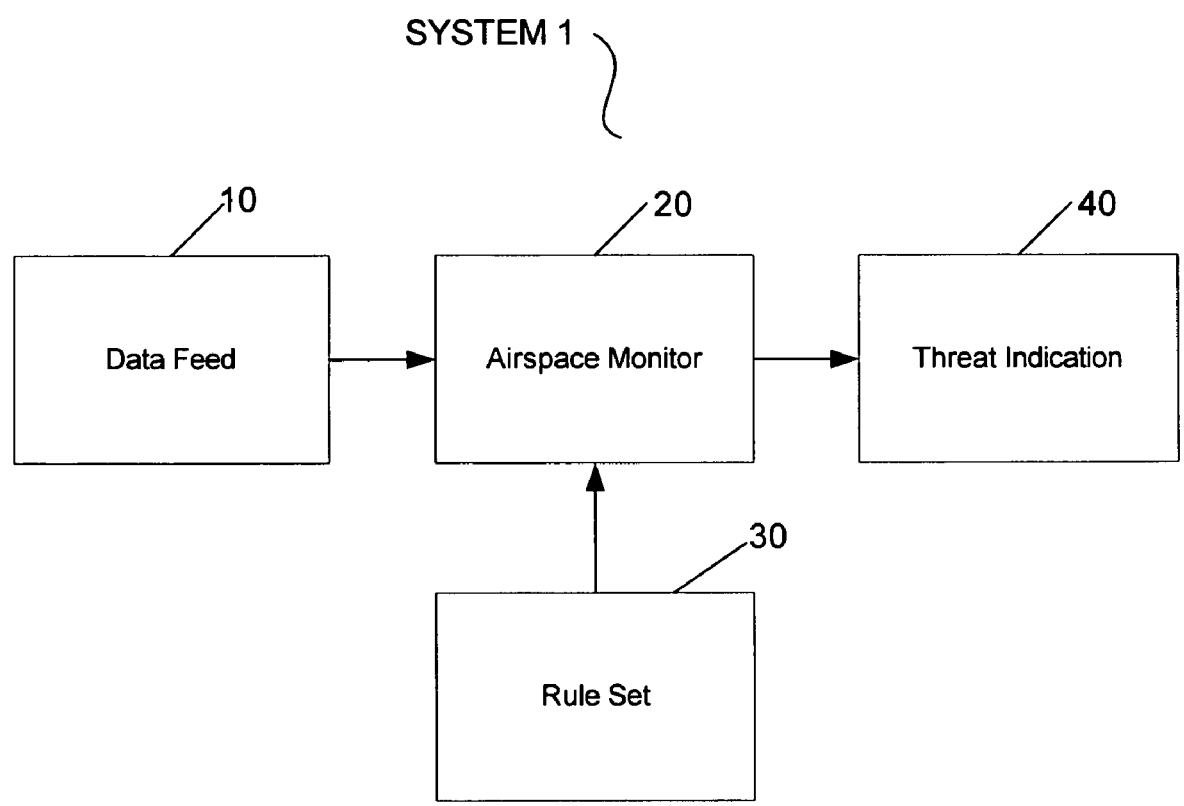
FIG. 1 shows an exemplary embodiment of a system for monitoring airspace and providing a threat indication according to the present invention.

The present invention may be further understood with reference to the following description and to the appended drawings, wherein like elements are referred to with the same reference numerals. The present invention provides for a system and method for alert classification to help identify and evaluate potential threat events while at the same time reducing the number of "false positives" which trigger inappropriate or excessive action. It should be noted that throughout this description, the examples provided are related to airspace within the United States and U.S. government entities. However, the exemplary embodiments of the present invention may be implemented in any jurisdiction or collection of jurisdictions throughout the entire world.

In the exemplary embodiment of the present invention, it is considered that the data for making such determinations is collected via a passive radar system. While the present invention is not limited to collecting data using a passive radar system, there may certain advantages that a passive radar system offers over, for example, an active radar system. For example, while most airports have both active and passive systems, other airspace may have neither. The complications of installing a passive radar system in non-airport airspace may be less than installing active radar stations. In addition, even at airports, the active radar stations are engaged for the purpose of air traffic control, which is a different function than the monitoring of airspace for threats. However, data from active radar systems or other sources may be used in addition to, or exclusive from, data from a passive radar system.

FIG. 1 shows an exemplary embodiment of a system 1 for monitoring airspace and providing a threat indication 40. As described above, the system includes a data feed 10 providing information concerning aircraft that are being monitored. An exemplary passive radar system may be, for example, the PASSUR® System sold by Megadata Corporation of Greenwich, Conn. An exemplary active radar data set may be, for example, the AD data set that is available for resale from the FAA. As described above, the data feed 10 may be one of these systems, another aircraft monitoring system, or a combination of these systems depending on the amount and type of information to be provided on each aircraft for the purposes of monitoring airspace. Target data points provided by a passive radar system for a particular aircraft may include, for example, the time (e.g., UNIX time), the x-position, the y-position, altitude, x-velocity component, y-velocity component, z-velocity component, the speed, the flight number, the airline, the aircraft type, the tail number, etc.

The data from the data feed 10 is input into an airspace monitor 20. A rule set 30 is also input into the airspace monitor 20. The airspace monitor 20 compares the data to the rule set and outputs a threat indication 40 for each of the aircraft that are being monitored within the airspace. Each of the components 20-40 will be described in greater detail below.

The following will provide exemplary rules that may be included as part of the rule set 30. Those skilled in the art will understand that the following rules are only exemplary and that users may desire to use some or all of the exemplary rules, define further rules or refine the definition of the described rules. Thus, the exemplary embodiments of the present invention may allow for customization of the rule set 30 that are used to evaluate the data when monitoring a particular airspace. For example, there may be different rule sets in use when monitoring a densely populated area versus a sparsely populated area or when monitoring an area around a nuclear plant as opposed to a national monument. In addition, while the rule sets may evaluate the same threats at different locations, the categorization of these threats may be different at different locations. Thus, this may allow users to evaluate threats that are more relevant for the airspace that is being monitored.

A first exemplary rule that may be input into a rule set is the definition of an Air Defense Identification Zone ("ADIZ"). The ADIZ may be a predefined ADIZ, e.g., the ADIZs defined by the Department of Homeland Security ("DHS") or the United States military for defense of North America. The ADIZ may also be one that is defined by the particular user of the system, e.g., the city of New York may define an ADIZ around certain landmarks or buildings or even the entire island of Manhattan. The exemplary rule that may be input into the rule set 30 for evaluation by the airspace monitor may be a "Violation of ADIZ." Thus, an aircraft that physically penetrates an ADIZ sector may create an alert. The triggers of such an alert may be the aircraft latitude/longitude.

For example, the rule set 30 may include a rule that defines the ADIZ for the Baltimore Washington Metropolitan Area. The rule may include the latitude and longitude boundaries of this exemplary ADIZ. As data is gathered on particular aircraft by a data feed 10 in the area of this ADIZ, the airspace monitor 20 may monitor the latitude/longitude of each aircraft and when an aircraft penetrates the ADIZ as defined in the rule, the airspace monitor 20 may create a threat indication 40 to warn users of the threat.

The threat indication 40 may be provided in a variety of manners. For example, in one exemplary embodiment, the threat indication 40 is provided as a visual and audio alert via a threat monitoring console. Thus, when the aircraft penetrated the ADIZ, the airspace monitor 20 may have generated a threat indication 40 that caused a user of the system to receive an audio alert (e.g., a bell, a noise generated by a computer sound card, etc.) and a visual display on a monitor (e.g., a red flashing screen). Other alerts may also be generated by the system (e.g., printouts, log history recordings, email alerts, etc.).

The threat indication 40 may include the type of threat (e.g., the penetration of an ADIZ), plus any additional information that is received by the airspace monitor 20 from the data feed 10. For example, the data feed 20 may also send information such as the type of aircraft, the flight number of the aircraft, the speed of the aircraft, the airline, etc. This additional information may be displayed or otherwise conveyed to the user in order to evaluate the threat.

The rules in the rule set 30 may be combined with other rules and/or additional data to further evaluate a potential threat. Continuing with the above example, the data feed 10 may provide the airspace monitor with real time flight data for purposes of monitoring the ADIZ (e.g., latitude/longitude), but the data feed 10 may also provide the airspace monitor 20 with the flight plans of aircraft that are expected in the area for a particular day. It should be noted that while the data feed 10 is described as a single data feed, it may include data from any number of sources, e.g., the data feed 10 may be a plurality of data feeds. Thus, in this example, when the airspace monitor 20 determines that an aircraft has penetrated the ADIZ, it may also determine if the data it has received concerning the aircraft includes a flight number. If the flight number is included, the airspace monitor 20 may cross check the flight number against filed flight plans. If there is a filed flight plan for the particular aircraft indicating that it will be penetrating the ADIZ, the airspace monitor may generate a lower level alert than for an aircraft that does not have such a flight plan or where a flight number is not received by the airspace monitor 20 so that it cannot cross reference such information.

A second exemplary rule included in the rule set 30 may be a rule for monitoring a specific transmission from aircraft. For example, aircraft may be equipped with an emergency transponder, e.g., an "Emergency Transponder" rule. The emergency transponder transmission may be initiated by a pilot or other crewmember to indicate an emergency on board the aircraft. The emergency could be a general emergency or may be specific (e.g., hijacking, loss of engine, loss of communications, etc.). The specific emergency message may be generated, for example, by the pilot entering a specific code into the emergency transponder.

The airspace monitor 20 may monitor the incoming data for transmissions from these emergency transponders. If such a transmission is received, the airspace monitor 40 may generate a threat indication 40. The specific threat indication 40 may be based on predetermined rules for the particular type of message received by the airspace monitor 20.

A third exemplary rule that may be included in the rule set 30 may be to define a "DHS Aircraft of interest." The DHS (or other government or private entity) may have a list of aircraft that it considers suspicious or desires to monitor for other reasons. Identifications of these aircraft may be included as a rule in the rule set 30. The identifications may include a tail number, owner, operator, etc. Thus, when such an aircraft entered into the airspace being monitored, the airspace monitor may generate a threat indication 40 indicating that an aircraft of interest has entered the monitored airspace.

The threat indication 40 of such an alert may also include an onscreen log or history of the events that caused that aircraft to be put on an alert list in the first place. Thus, the rule may include an attached list or log history for the aircraft. Thos skilled in the art will understand that such a log or history may be related to the rule in any number of manners including pointers or relational database methods.

A fourth exemplary rule may be an "Abnormal Behavior" rule. For example, aircraft that show sudden deviations in speed, altitude, direction, transponder settings, etc. may create a weighted threat indication 40. The rules for such abnormal behavior may be predetermined thresholds. Each activity may have a series of thresholds and the airspace monitor 20 may generate different levels of threat indications 40 based on these predetermined thresholds. For example, an altitude change of 1,000 feet in a period of less than 10 seconds may cause the airspace monitor 20 to generate a first threat indication 40 having a first threat level. While, an altitude change of 2,000 feet in a period of less than 10 seconds may cause the airspace monitor 20 to generate a second threat indication 40 having a higher threat level.

These rules may also be combined to generate any number of levels of threat indications 40 based on, for example, the number of each abnormal behavior an aircraft is demonstrating. For example, a sudden change in speed AND altitude AND direction AND transponder status may create a higher level of alert than if only one of the aforementioned behaviors was exhibited.

A further refinement of the abnormal behavior rule may be considered to be an "Aircraft out of position" rule. This refinement of the rule is not only based on the current behavior of the aircraft, but may also be based on a historical activity of the particular aircraft or on the type of aircraft. For example, the rules in the rule set may include a set of latitudes/longitudes where 757-300 planes typically do not fly. If such an aircraft type enters these coordinates, the airspace monitor may generate a threat indication.

These rules based on historical data may be automatically refined as the airspace monitor 20 and/or the rule set 30 collects additional information about the airspace being monitored. In addition, the users may manually manage such historical rules. For example, if there is a change to flight paths in an area, the user may disable or modify a particular rule so that the data collected from aircraft in the new flight path does not spuriously generate threat indications 40.

This aircraft out of position historical rule may also be combined with the "abnormal behavior" rule(s) to generate a higher level of threat indication 40. For example, the 757-300 which triggers an "out of position" threat indication AND a sudden change in speed AND altitude threat indications may combine to create a much higher level of threat indication than an "out of position" threat indication alone. Again, this combination of rules is only exemplary and it would be understood by those skilled in the art that any number of rules may be combined and/or stand on their own based on the particular activity for which a threat indication is to be generated.

A fifth exemplary rule may be a "Repeat Concern" or "Repeat Offender" rule. An example of an aircraft that may run afoul of such a rule is an aircraft that repeatedly flies close to areas of concern, without actually violating specific ADIZ sectors. This may be another example of historical data keeping and rule making based on a particular aircraft's behavior. For example, a rule in the rule set, may indicate that if a particular aircraft (e.g., identified by tail number) approaches an ADIZ a certain number of times within a certain period (e.g., within 3 miles of an ADIZ, 5 times in two weeks), an additional rule may be generated and added to the rule set that indicates that this aircraft should be monitored whenever it is in the monitored airspace.

However, since this aircraft has not violated any specific rules, such as penetrating an ADIZ, this may allow for the monitoring of an aircraft without elevating these events to full blown high level alerts, thereby causing an unnecessary overreaction to the events. In addition, if the further monitoring indicates that the aircraft is not a threat, the rule for monitoring the aircraft may be erased or modified either automatically (based on other rules) or manually if the users determine that further monitoring is not necessary.

Figure 2:
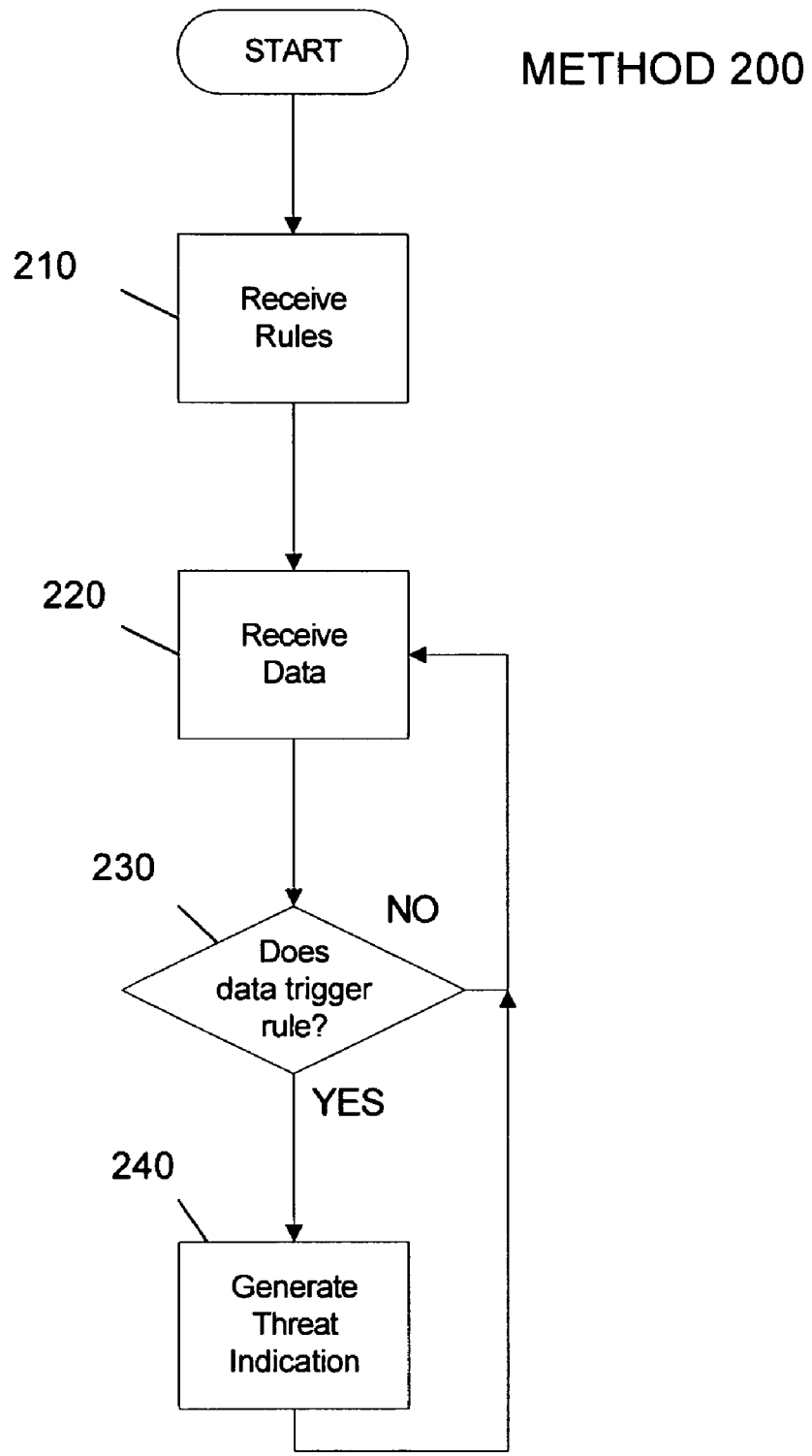
FIG. 2 shows an exemplary method for monitoring airspace and providing a threat indication according to the present invention.

FIG. 2 shows an exemplary method 200 for monitoring airspace and providing a threat indication. The exemplary method 200 will be described with reference to the components described in FIG. 1. In step 210 the airspace monitor 20 receives the rule set 30 including the rules that will be used to evaluate the data. The above description described some exemplary rules that may be provided within the rule set 30. It also described how the rules may be generated, e.g., by the user, based on predetermined definitions such as the definition of an ADIZ, automatically using historical data, etc.

In step 220, the airspace monitor 20 receives the data from the data feed 10. The data may include various types of information that is collected by various monitoring systems (e.g., passive radar systems) for aircraft that are in the airspace being monitored. In step 230, the airspace monitor 20 compares this data to the rules that were provided in step 210 to determine if the data triggers any of the rules.

If no rules are triggered, the method continues back to step 220 to continue receiving data and continuously comparing this data to the rules in step 230. However, if in step 230, a rule is triggered, the airspace monitor 20 generates a threat indication 40. The specific threat indication 40 that is generated is based on the rule that is triggered. After triggering of the threat indication 40, the method continues back to step 220 to continue receiving data and continuously comparing this data to the rules in step 230. Thus, the method 200 is a continuous monitoring method for the airspace in question. In addition, while not shown in method 200, the rules that are part of rule set 30 may be modified, added to or deleted and reloaded into the airspace monitor 20 for purposes of evaluating the data received from the data feed 10.

As described above, the airspace monitor 20 may receive data from any number of data feeds that may be used to evaluate the activities that are being monitored. For example, the airspace monitor may be provided with comprehensive information to evaluate the aircraft, owner, and aircraft operator. This may also include a collaborative web site, email or a one-click link to an aircraft's company System Operations Center, a dispatch facility, or the closest airport in question. This capability could sort out miscommunications, understanding abnormal behavior etc. Such activity could be retrieved both automatically for evaluation or, after a threat indication 40 is generated, a user could manually check on such information to determine further steps that should be taken to respond to the threat indication.

In addition to monitoring aircraft that are currently in-flight, the airspace monitor may record flight information for further evaluation at a later time. For example, there may be a set of rules in the rule set 30 that are used to generate real time threat indications 40. However, the rule set 30 may also include a further set of rules that are used by the airspace monitor 20 to further break down behavior based on a replay of flight events. This evaluation may provide insight into long term or underlying patterns of threat activities and may be used to further refine the real time rules in order to differentiate real threats from false threats. This historical data may also be provided to aircraft owners/operators to visually identify the level of deviation of flight behavior from the norm. This information may be used by the owner/operator to train pilots to avoid potentially appearing as a threat.

Figure 3:
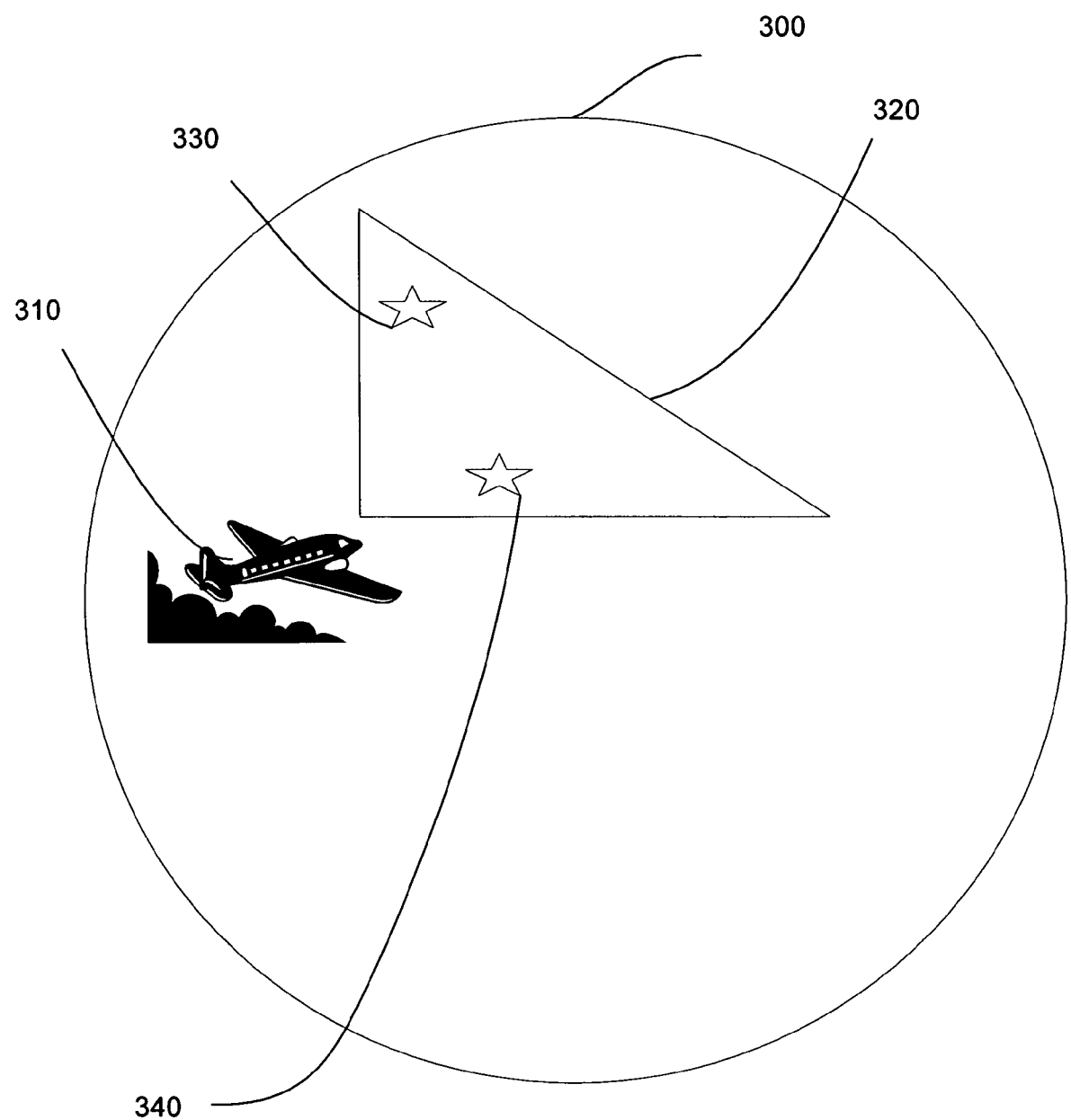
FIG. 3 shows an exemplary depiction of a predictive capability of the exemplary system for monitoring airspace according to the present invention.

FIG. 3 shows an exemplary depiction of a predictive capability of the exemplary system for monitoring airspace. The airspace monitor 20 may include the predictive capability. As shown in FIG. 3, a display may show the complete airspace 300 being monitored. In this example an aircraft 310 of interest is being monitored. Based on a current velocity vector of the aircraft 310, the airspace monitor 20 may convert this information into a "plume" or "cone" of probability 320. The cone 320 may show any ground objects (e.g., ground objects 330 and 340) the aircraft 310 could reach and approximately when based on the velocity and other current characteristics of the aircraft. Such information could be provided via additional textual characters on the display (not shown). The probability would be highest in the middle of the cone 320, along the aircraft's 310 current heading. If the aircraft 310 is turning, the cone 320 would be turning with it. The length of the cone 320 may be proportional to estimated fuel reserves or some other relevant criteria. Sensitive objects 330 and 340 within the cone 320 may become highlighted and the user could activate alerts for multiple objects with a single mouse click. For example, there may be different types of alerts, procedures and notifications required based on the threat level probability and the potential target. This predictive capability may be enabled not just for aircraft that are already tagged as intruders, but also for those flying close to the ADIZ. This functionality may reduce potential false alarms by triggering earlier contact with the potential intruder aircraft (if the latter is doing so by mistake).

In the above description, it was described that different rules or combination of rules may generate different levels of threat indications 40. These different levels of threat indications 40 may be displayed and/or indicated to a user in different manners. In addition, the different levels of threat indications may also trigger different activities by the user of the system or automatic events. For example, a very low level of threat indication may only indicate that a user continues to monitor the activities of an aircraft that generated the threat indication. A slightly higher level of threat indication 40 may require the user to contact the aircraft (directly or indirectly) to determine why the aircraft generated such a threat indication 40.

Those skilled in the art will understand that the user activities may be any type of activity that is appropriate for the level of threat indication 40 that is generated. This activity may be anywhere from that described above to scrambling fighter jets to deal with a specific threat. Also, some threat indications 40 may cause the airspace monitor 20 (or other backend component) to send out communications to third parties such as police, fire, DHS, military, etc. In addition, the system 1 may provide visualization and analyze defense asset locations (helicopters, DHS fixed-wing aircraft, fighter escort jets, Ground-to-Air missiles), as well as, for each asset, time to intercept the violator in question.

Also in the above description, the airspace monitor 20, rule set 30 and threat indication 40 have been described with respect to their exemplary functions. There may be any number of manners to implement the described functionality. For example, each of the components 20-40 may be implemented in a threat console that includes a server and a display. The server may include communication capabilities for receiving data from the data feed 10. The rule set 30 may be stored on the server in, for example, a database or other programmatic manner. The airspace monitor 20 may be implemented as one or more software modules for evaluating the received data against the rules in the rule set 30. When the airspace monitor 30 generates the threat indication 40, this may trigger a user interface on the display to indicate the threat indication to the user. The display may have a series of user interfaces to allow the user to interact with the rule set 30 (e.g., to modify the rules) and/or airspace monitor 20 (e.g., to respond to the threat indication 40).

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A method, comprising:
   receiving data corresponding to an aircraft in a monitored airspace;
   comparing the data to rules, each rule corresponding to a threat posed by the aircraft;
   generating a threat indication based on a first one of the rules triggered by the data;
   comparing the data to a second one of the rules, the second one of the rules being selected based on the first one of the rules, wherein a level of the threat indication corresponds to the first rule that was triggered and whether the second rule is further triggered by the data; and
   generating a history of data for the aircraft and using the history of data to update the rules by adding, removing, or modifying the rules.

2. The method of claim 1, wherein the data is received from a passive radar system.

3. The method of claim 1, wherein the data includes one of a time, an x-position, a y-position, an altitude, an x-velocity component, a y-velocity component, a z-velocity component, a speed, a flight number, an airline, an aircraft type and a tail number.

4. The method of claim 1, wherein the rules include one of a violation of an ADIZ rule, an emergency transponder rule, an aircraft of interest rule, an abnormal behavior rule and a repeat offender rule.

5. The method of claim 1, further comprising:
   generating a user indication corresponding to the threat indication.

6. The method of claim 5, wherein the user indication is one of a visual display alert, an audio alert, a printout alert, a communication via an electronic message and a log history.

7. The method of claim 1, wherein the data is received from a plurality of data feeds.

8. The method of claim 1, further comprising:
   generating the rules, wherein the rules are generated by one of a manual input of rules and a comparison of received historical data.

9. The method of claim 1, further comprising:
   responding to the threat indication based on the level of the threat indication.

10. The method of claim 1, further comprising:
    predicting at least one threat based on the data and information corresponding to the monitored airspace.

11. The method of claim 10, wherein the information includes a location of ground objects in the monitored airspace.

12. A system, comprising:
    a rule set including a plurality of rules corresponding to potential threats in a monitored airspace; and
    an airspace monitor receiving data corresponding to aircraft in the monitored airspace and comparing the data to the plurality of rules, the airspace monitor generating a threat indication when the data triggers a first one of the rules, the airspace monitor comparing the data to a second one of the rules, the second one of the rules being selected based on the first one of the rules, wherein a level of the threat indication corresponds to the first rule that was triggered and whether the second rule is further triggered by the data,
    wherein the airspace monitor generates a history of data for an aircraft and uses the history of data to update the rule set by adding, removing, or modifying the plurality of rules.

13. The system of claim 12, wherein the data is received from a passive radar system.

14. The system of claim 12, wherein the data includes one of a time, an x-position, a y-position, an altitude, an x-velocity component, a y-velocity component, a z-velocity component, a speed, a flight number, an airline, an aircraft type and a tail number.

15. The system of claim 12, further comprising:
    a user alert module indicating the threat indication to a user, the user alert module including one of a visual display alert, an audio alert, a printout alert, a communication via an electronic message and a log history.

16. The system of claim 12, wherein the rule set generates the rules by comparing historical data received by the airspace monitor.

17. The system of claim 12, wherein the airspace monitor predicts at least one threat based on the data and information corresponding to the monitored airspace.

18. A system comprising a memory storing a set of instructions and a processor executing the instructions, the instructions being operable to:
    receive data corresponding to an aircraft in a monitored airspace;
    compare the data to rules, each rule corresponding to a threat posed by the aircraft;
    generate a threat indication based on a first one of the rules triggered by the data;
    compare the data to a second one of the rules, the second one of the rules being selected based on the first one of the rules, wherein a level of the threat indication corresponds to the first rule that was triggered and whether the second rule is further triggered by the data; and
    generate a history of data for the aircraft and use the history of data to update the rules by adding, removing, or modifying the rules.

* * * * *